UNITED STATES PATENT OFFICE.

GUSTAV GAERTNER, OF VIENNA, AUSTRIA-HUNGARY.

PROCESS OF REDUCING PROPORTION OF CASEIN IN MILK.

SPECIFICATION forming part of Letters Patent No. 580,041, dated April 6, 1897.

Application filed May 6, 1895. Serial No. 548,310. (No specimens.) Patented in Germany September 26, 1894, No. 82,510; in France September 26, 1894, No. 241,675; in Belgium October 13, 1894, No. 112,225; in Italy December 31, 1894, XXIX, 37,487, and LXXV, 52, and in England April 23, 1895, No. 8,044.

*To all whom it may concern:*

Be it known that I, GUSTAV GAERTNER, a subject of the Emperor of Austria-Hungary, residing at Vienna, in the Province of Lower Austria, in the Empire of Austria-Hungary, have invented certain new and useful Improvements in the Process of Reducing the Proportion of Casein Contained in Milk, (for which I have obtained patents in France, No. 241,675, dated September 26, 1894; in Belgium, No. 112,225, dated October 13, 1894; in Italy, XXIX, 37,487, and LXXV, 52, dated December 31, 1894; in England, dated April 23, 1895, No. 8,044, and in Germany, dated September 26, 1894, No. 82,510;) and I do hereby declare the following to be a full, clear, and exact description of the invention, such as will enable others skilled in the art to which it appertains to make and use the same.

Pure cow's milk is nearly altogether indigestible for the newly-born during the first months of their existence. This fact has been known for a long time and is due, first, to the presence in cow's milk of much larger quantities of casein than in human milk; second, to the casein from cow's milk coagulating into harder lumps than human casein.

To convert cow's milk into a product suitable for the food of infants, it is necessary to dilute it with at least two or three parts of water. This process, which is now applied in all cases where infants have to be reared artificially, *i. e.*, from animal milk, has a serious defect, which has been known for a long time and has been dealt with in detail in various works concerning the subject, (for instance, *Biedert Kinderernæhrung*, second edition, 1893,) namely, that by adding water to the milk the proportion of fat it contains, *i. e.*, the nutritive power of the milk is at the same time reduced to a great extent. Whereas maternal milk contains three per cent. or more of fat, the mixtures used for feeding infants artificially contain only one or at the utmost only one and one-half per cent. of the same. Hitherto three methods have been suggested to obviate this defect. According to one method (Biedert) fresh or preserved cream is added to the milk, but this process is practically so complicated that even its inventor only applies it exceptionally. According to a second method the deficient butter fat is supplied by vegetable fat. (Lahmann.) According to a third method the fat is supplied by the addition of milk-sugar in excess. (Soxhlet.) The enumeration of these recently-suggested processes suffices to show that hitherto no simple general method applicable on a large scale has been known for converting cow's milk into a food suitable for infant children, that is to say, for rendering it poor in casein and rich in fat, and that the process hereinafter described may be considered new notwithstanding its great simplicity.

This invention relates to a simple process easily applicable on a large scale for reducing the proportion of casein contained in milk without altering or while regulating the proportion of fat.

This result is obtained in two ways—either the natural cow's milk is freed by centrifugal separation from a certain quantity of meager milk containing no or little fat, (whereby a corresponding quantity of casein is eliminated from the milk,) the part of the milk thus removed being replaced by another liquid containing no casein, or this latter liquid is first added to the natural milk, so that the existing quantity of casein becomes thus distributed in a larger quantity of liquid, and the whole is then treated in a centrifugal separator in order to obtain the desired product rich in fat.

If, for instance, the quantity of natural milk to be treated in the separator is mixed with twice that quantity of water or other liquid free of casein, such as sweet whey, decoctions of a mylaceous substances, &c., the relative proportion of casein contained in the mixture is reduced to one-third of the original proportion of casein contained in the natural milk. If the mixture is then treated in a centrifugal separator and the outflow of the fat milk properly regulated, a product will be obtained which contains the desired quantity of fat and only one-third of the casein contained in the natural milk. Of course the same result may also be obtained by treating the natural milk in a centrifugal separator regulated as above, throwing out two-thirds of the whole quantity as meager milk and adding afterward to the cream thus obtained twice its quantity of a liquid containing no casein. As the eliminated quantity of meager milk has carried off two-thirds of the absolute proportion of casein the relative proportion of casein in the final mixture will also be one-third of the original quantity of casein contained in the natural milk. As a matter of course, some fat will be extracted with the meager milk, *i. e.*, with the heavier product of the treatment in the separator. However, the quantity of fat thus carried away will be exceedingly small, negligible, and of no moment for the practical application of the process on a large scale.

I do not desire herein to claim the method last described, as this forms the subject-matter of a separate application for patent filed February 3, 1897, Serial No. 621,854.

I claim—

1. The herein-described method of producing from the milk of animals a substitute for human milk, by reducing the proportion of casein in the former to the proportion of casein in the latter, which consists in diluting the milk with a liquid free from casein and removing the excess of casein with the diluent, substantially as set forth.

2. As a substitute for human milk, animal milk having the proportion of casein therein reduced to substantially the proportion of casein in human milk, its fatty constituents remaining practically unchanged.

In testimony whereof I affix my signature in presence of two witnesses.

GUSTAV GAERTNER.

Witnesses:
DEAN B. MASON,
JOSEF ZEHETAN.